Sept. 29, 1931.  A. C. GODDARD  1,825,147
FRICTION PIVOT HINGE
Filed Feb. 11, 1928
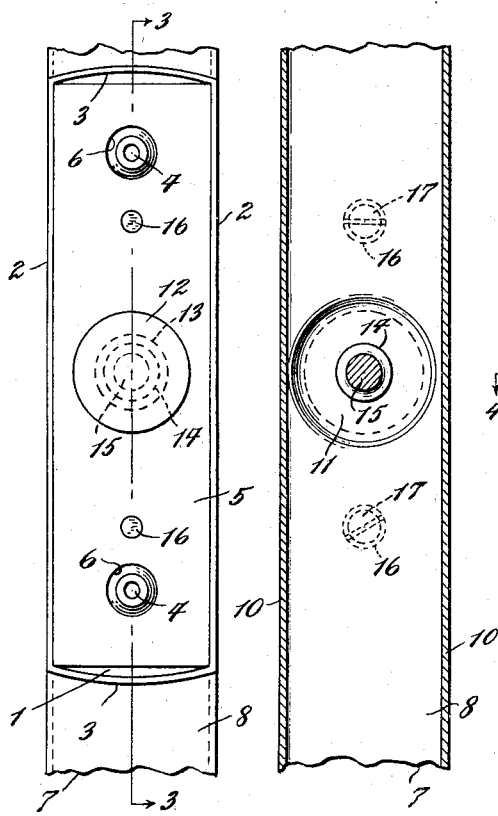
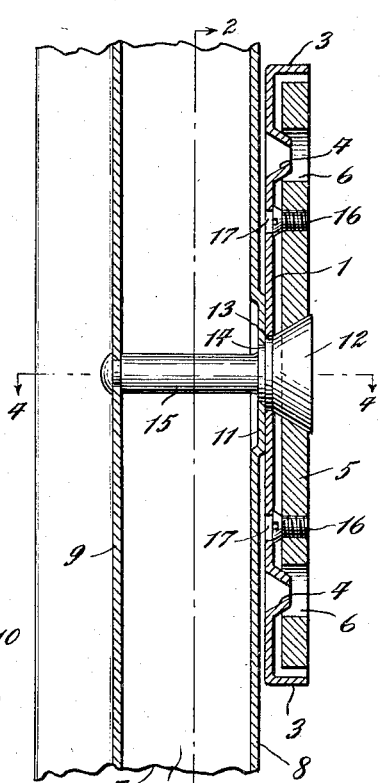
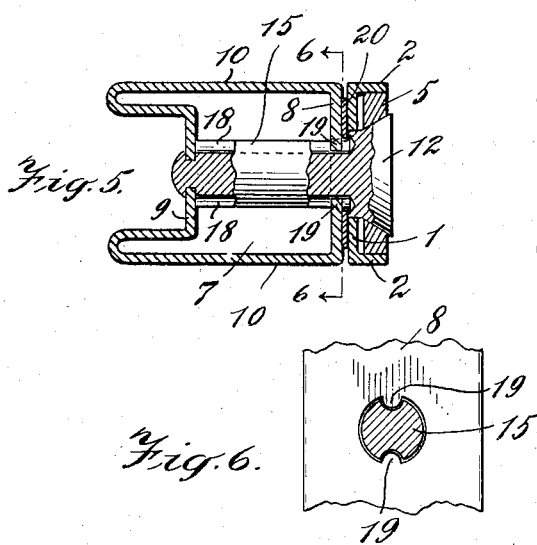
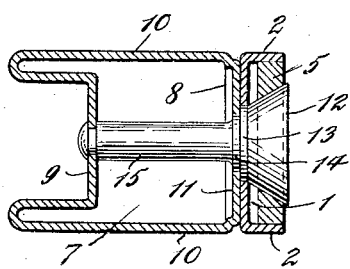
INVENTOR.
Alvin C. Goddard
BY
Victor D Borst
ATTORNEY Patented Sept. 29, 1931

1,825,147

UNITED STATES PATENT OFFICE

ALVIN C. GODDARD, OF FOREST HILLS, NEW YORK

FRICTION PIVOT HINGE

Application filed February 11, 1928. Serial No. 253,568.

My invention relates to pivot friction hinges of the type shown and described in my copending application Serial No. 211,652 filed August 9, 1927 entitled "Pivot hinges."
In my copending application I have disclosed a complete friction hinge which may be sold as a complete article and is adaptable to many uses. In my present application I shall disclose a particular form and adaptation of a similar type hinge which may be embodied into a metal casement or frame structure surrounding a metal or wooden transom or window assembly as an integral part thereof utilizing the frame as an element of the hinge.

As in my prior application the hinge includes two principal elements, a movable element and a relatively stationary element, a friction plate mounted within one of those elements, the plate being adjustable toward and from the elements and a connecting medium. The plate has a tapered opening therein and the three members are pivotally held together by a pivot member having a tapered portion cooperating with the tapered opening in the friction plate to provide an adjustable friction hinge connection. The pivot member also serves to carry the weight of the window but does so upon a journal portion distinct from the tapered friction portion, thus the frictional effect is independent of the weight of the window being supported. In the present instance the pivot member is extended to bridge the frame member and is rigidly secured to the rear wall thereof removed from the wall serving as a principal member of the hinge. This construction tends to strengthen the frame member by giving it added stiffness at the point of application of the hinge and also serves to add rigidity to the pivot pin to more readily support heavy rotative members without sagging.

Further details of structure will be given in connection with the drawings in which:

Fig. 1 is a rear elevation of a hinge constructed in accordance with my invention;

Fig. 2 is a horizontal section taken on line 2—2 of Fig. 3;

Fig. 3 is a longitudinal section on line 3—3 of Fig. 1;

Fig. 4 is a transverse section taken on line 4—4 of Fig. 3;

Fig. 5 is a section similar to Fig. 4 illustrating a modified form of my invention, and Fig. 6 is a section taken on line 6—6 of Fig. 5.

In the illustrated embodiment of my invention, the movable member or element of the hinge comprises a rectangular shaped base plate 1 having an aperture through the center thereof and having flanged side walls 2 and end walls 3, thus forming a cup-like member. The base plate is also provided with countersunk openings 4 adjacent each end, through which securing screws may be inserted to rigidly fasten the plate to a window, transom or the like. A friction block or plate 5 having a tapered central opening therein, concentric with the central opening in the base plate, fits freely within the flanges of the base plate, thus permitting sliding movement of the friction plate to and from the base plate but preventing rotary movement thereof relatively to the base plate, the thickness of the friction plate being less than the height of the side and end walls. The friction plate also has a pair of openings 6 adjacent each end in alignment with openings 4 whereby securing screws may pass therethrough without interfering with free movement of the friction plate.

The sheet metal jamb or frame member 7 which surrounds the window or transom, as the case may be, is the second principal member constituting the stationary element of the hinge and which supports the base plate 1. This member is usually substantially rectangular in section, the front edge 8 being flat and the rear edge 9 channeled, the two edges being joined by side walls 10. The front edge 8 may be struck outwardly to form a circular boss 11 which spaces the base plate 1 from the edge 8 and through which the central opening is made.

A pivot pin extends across the frame member and through the base plate and has a large tapered end 12, having a complemental taper to that of the central opening in friction plate 5, immediately adjacent to which is a short straight section 13 of a diameter equal to the central opening in plate 1. Adjacent the straight portion 13 there is a second straight portion 14 somewhat smaller in diameter and fitting the opening in the boss 11 after which the pin continues in a shank portion 15 which bridges the space between front edge 8 and rear edge 9, being firmly riveted to the rear edge 9 to prevent rotation of the pin.

The amount of friction between the tapered end 12 of the pin and friction plate 5 may be varied by adjusting the position of plate 5 relatively to plate 1. For this purpose plate 5 is tapped to receive a pair of flat head screws 16, the heads of which bear against the inner surface of plate 1 which screws may be adjusted through apertures 17, in plate 1, the apertures being of smaller diameter than the screw heads.

In the modification shown in Figs. 5 and 6 I have provided additional means for assuring non-rotation of the pivot pin. In this form the shank portion 15 of the pivot pin has longitudinal semicircular grooves 18 cut therein. The front edge 8 of the stationary member has tongues 19 left projecting inwardly into the aperture through which the shank extends which engage in slots 18 and positively prevent rotation of the pin relatively to the stationary member.

In this modification I dispense with the circular boss serving as a spacing means between the stationary member and the base plate 1 and substitute therefor a spacing bearing washer 20 which is inserted between the edge 8 and the base plate 1.

From the above description it can readily be seen that there is provided a very simple yet rigid and efficient friction hinge of few parts, the pivot of which carries the weight upon a section entirely independent of the friction producing portion. In use a base plate 1 may be secured to a casement or French window, transom or the like upon each side thereof and the pivot may be secured to the frame to support the window therein. The friction may be adjusted to any desired degree by swinging the window partially open and adjusting screws 16 until the desired resistance is attained. The length of the pivot pin and the method of securing the same provides these important features, first it adds great stability to the hinge itself permitting the hanging and pivoting of relatively heavy windows, second it gives greater rigidity to the surrounding frame at a point where it is most needed and third it eliminates the necessity of a separate hinge element by utilizing the frame as a part of the hinge.

It is obvious that various changes in the detail of structure may be made without departing from the spirit and scope of the invention as defined in the claims.

I claim:

1. The combination with a hollow metallic window frame member, of a pivot pin extending across and secured at one end to said member, a hinge plate rotatably journaled on said pin intermediate its ends, and a friction plate frictionally engaging the other end of said pin to retard rotation of said hinge plate upon said pin.

2. The combination with a hollow metallic window frame member, of a pivot pin extending across and secured at one end to said member, a hinge plate rotatably journaled on said pin intermediate its ends, and a friction plate frictionally engaging the other end of said pin to retard rotation of said hinge plate upon said pin and means for adjusting the retardation effect of said friction plate.

3. A friction pivot hinge comprising a pivot pin having a tapered end portion, an intermediate bearing portion, and an elongated shank portion adapted to extend across to be secured to a window frame member, a hinge plate rotatably mounted upon said bearing portion of said pin, a friction plate mounted for rotation upon said tapered end portion and means for securing said friction plate to said hinge plate for rotation therewith.

4. The combination with a hollow metallic window frame member, of a pivot pin extending across and secured at one end to said member for supporting the frame member, means for preventing rotation of said pin relatively to said member, a hinge plate rotatably journaled on said pin intermediate its ends, and a friction plate frictionally engaging the other end of said pin to retard rotation of said hinge plate upon said pin.

5. The combination with a hollow metallic window frame member, of a pivot pin extending across and secured at one end to said member, means for preventing rotation of said pin relatively to said member comprising grooves in said pin and cooperating tongues on said member, a hinge plate rotatably journaled on said pin intermediate its ends, and a friction plate frictionally engaging the other end of said pin to retard rotation of said hinge plate upon said pin.

6. A friction pivot hinge comprising a pivot pin having a tapered end portion, an intermediate bearing portion and a shank portion adapted to be secured to a window frame member, means for preventing rotation of said pin relatively to said frame member, a hinge plate rotatably mounted upon said bearing portion, a friction plate mounted for rotation on said tapered end portion, means for securing said friction plate to said hinge plate for rotation therewith and means for varying the friction between said friction plate and said pivot pin.

7. A friction pivot hinge comprising a pivot pin having a tapered end portion, an intermediate bearing portion and a shank portion adapted to be secured to a window frame member, means for preventing rotation of said pin relatively to said frame member, comprising grooves cut in said shank portion and tongues formed in said frame member engaging in said grooves, a hinge plate rotatably mounted upon said bearing portion, a friction plate mounted for rotation on said tapered end portion, means for securing said friction plate to said hinge plate for rotation therewith and means for varying the friction between said friction plate and said pivot pin.

8. A pivot hinge comprising in combination a hollow metallic window frame member, a pivot pin extending through said member and secured thereto, a hinge plate rotatably mounted on said pin intermediate its ends, and a friction plate frictionally engaging said pin to retard rotation of said hinge plate.

9. A pivot hinge comprising in combination a hollow metallic window frame member, a pivot pin extending through said member and secured thereto, a hinge plate rotatably mounted on said pin intermediate its ends and in frictional engagement with the frame member, and a friction plate frictionally engaging said pin to retard rotation of said hinge plate.

10. The combination with a hollow metallic window frame member, of a pivot pin extending across and providing a stiffening for said member, a hinge plate rotatably journaled on said pin intermediate its ends and in frictional engagement with the frame member, and a friction plate frictionally engaging one end of said pin to retard rotation of said hinge plate upon said pin.

In witness whereof, I hereunto subscribe my signature.

ALVIN C. GODDARD.